United States Patent [19]

Haptonstall

[11] 3,885,693

[45] May 27, 1975

[54] COMBINATION VEHICLE AND BOAT

[76] Inventor: Jimmie L. Haptonstall, 411 Ridgeview, Rockwall, Tex. 75087

[22] Filed: Jan. 19, 1973

[21] Appl. No.: 325,094

[52] U.S. Cl. ............ 214/516; 214/450; 296/23 MC; 296/23 B
[51] Int. Cl. ............................................. B60p 1/36
[58] Field of Search ............ 214/515, 516, 517, 85, 214/85.1, 450, 83.24; 296/23 B, 23 MC, 23 R; 193/4 Z; 180/14 R

[56] References Cited
UNITED STATES PATENTS

| | | | |
|---|---|---|---|
| 2,862,636 | 12/1958 | Miller | 214/505 |
| 3,262,591 | 7/1966 | Aldropp | 214/517 |
| 3,346,132 | 10/1967 | Duszka | 214/516 |
| 3,411,644 | 11/1968 | Cook | 214/517 X |
| 3,460,693 | 8/1969 | Oldham | 214/450 |
| 3,539,219 | 11/1970 | Mueller | 296/23 |
| 3,687,314 | 8/1972 | Haugland | 214/85 X |
| 3,719,244 | 10/1971 | Miller et al. | 180/14 R |
| 3,734,321 | 5/1973 | Long | 214/450 |

*Primary Examiner*—Albert J. Makay
*Attorney, Agent, or Firm*—Clegg, Cantrell & Crisman

[57] ABSTRACT

Disclosed is a combined vehicle and boat including a prime mover with an open-topped bed, a rearwardly displaceable wheeled cradle mounted on the bed, and a boat hull positionable on the cradle. The boat and prime mover body fair into each other to provide a unitary appearance. In one embodiment the wheeled cradle is integrated with the prime mover chassis for over-the-road operation.

2 Claims, 7 Drawing Figures

COMBINATION VEHICLE AND BOAT

BACKGROUND OF THE INVENTION

This invention relates to the field of recreational equipment, and is particularly concerned with a combination vehicle and boat.

Recently two forms of recreational equipment have shown great increases in popularity among those who enjoy outdoor activities. The first of these is the camper vehicle, which commonly appears in two basic variants. One is in the form of a pickup truck with a more or less elaborate aluminum house structure built over the cargo bed of the truck. Accomodations vary from the very spartan, such as air mattresses and sleeping bags, to interiors similar to house trailers, but on a smaller scale. The other variant is a van-type vehicle with more or less elaborate accomodations in the cargo section of the van.

The other type of recreational equipment which has grown in popularity recently is the houseboat, which is usually a modified flatboat type shallow draft hull with a lightweight but commodious cabin covering most of the area of the hull, and having living accomodations inside of the cabin cruiser type. Such houseboats are commonly powered by large outboard motors or inboard motors equipped with stern drives or out-drives. Some houseboats designed for use on inland lakes and streams are adaptable to being pulled along highways on boat trailers.

Both types of equipment have shortcomings and drawbacks. In camper vehicles, the cargo space of the vehicle is substantially permanently devoted to living accomodations, and the living accomodations must necessarily be hauled around with the vehicle wherever it goes, even for short trips in the neighborhood of a camp site. Houseboats are usually clumsy to haul by boat trailer and are not particularly well adapted for use in the manner of a house trailer, in the event it is desired to do so by living in them on land while they are parked on their boat trailers. For those who desire both the advantages of a houseboat and the advantages of a camper vehicle, it is presently necessary to acquire each separately which means investing in the living accomodation portion of both types of equipment, notwithstanding that this results in a duplication of living facilities.

SUMMARY OF THE INVENTION

In accordance with the present invention there is provided a combination vehicle and boat which combines the capabilities and advantages of camper vehicles and houseboats, and at the same time overcomes the disadvantages of each. The vehicle so provided is capable of use in the manner of a conventional camper, as a houseboat, and as a parked house trailer separate from the prime mover, which may then be devoted to other uses.

The combined vehicle and boat includes a prime mover, which is generally of pickup truck configuration, that it, is has a cab for driver and passengers near the front end thereof, located generally over the internal combustion power plant, and an open topped bed occupying the rear portion of the truck. A wheeled cradle is slidably mounted on the open topped bed, and equipment is provided for displacing the cradle rearwardly off the open topped bed to a position behind the truck. It can then be backed down a launching ramp in conventional fashion. A boat hull is positioned on the cradle, and in accordance with the preferred embodiment of the invention, the boat hull, its cabin, and the body work of the prime mover, such as the cab and side walls of the bed of the truck, are all designed so that when the boat is positioned on the cradle and the cradle is positioned on the truck bed, the various portions of the combination fair into one another to give the appearance of a unitary piece of equipment. An embodiment of the invention which is particularly adapted for large boat hulls includes provisions for the wheels of the cradle to also serve as load bearing wheels of the prime mover part of the unit.

It is an object of the present invention to provide a combined vehicle and boat capable of use as a camper, as a house trailer, and as a houseboat, while eliminating the duplication of facilities, particularly living accomodations, inherent in such equipment when considered separately.

It is a further object of the invention to provide a prime mover and wheeled cradle combination for use in a combined vehicle and boat which is simple and reliable in construction and operation.

The foregoing objects and purposes, together with other objects and purposes, can be better understood from a consideration of the detailed description which follows, together with the accompanying drawings.

DESCRIPTION OF THE PREFERRED EMBODIMENTS

Figure 1:
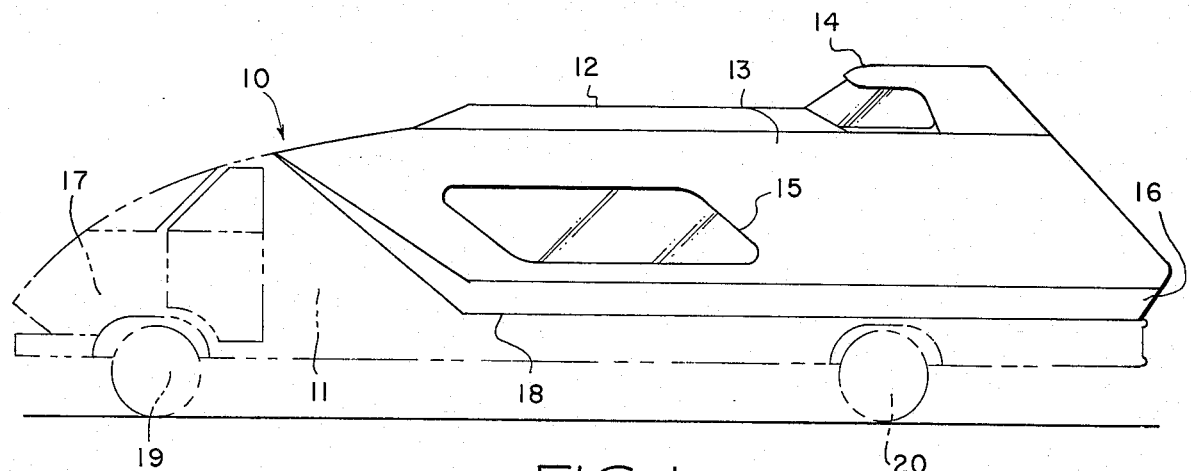
FIG. 1 is a somewhat diagramatic side elevational view of one embodiment of the invention, with portions shown in dotted outline for reasons discussed below.

One embodiment of the combined vehicle and boat of the present invention is illustrated in FIG. 1 where it is designated generally as 10. It includes a prime mover section 11 and a boat section 12. As can be seen from FIG. 1, the boat 12 is of the houseboat type having a shallow draft flatboat type hull 16, which is partly out of sight in FIG. 1, and a cabin 13 which covers most of the area of the hull in typical houseboat fashion. The cabin is provided with a flying bridge 14 from which the boat is operated, and a cabin window 15.

FIG. 1 also shows that the prime mover section 11 is generally in the configuration of a pickup truck. That is, it includes a cab section 17 at the front end thereof, which cab accomodates the driver and the passengers, and also covers the internal combustion engine for propelling the vehicle, the driver's compartment being positioned generally over the engine.

The rear portion of the prime mover unit 11 is devoted to an open topped bed designated 18 on which the houseboat 12 sits. It is preferred, in accordance with the invention, that the body work of cab 17 and the side walls of the open topped bed 18 be configured and proportioned with respect to the hull 16 and cabin 13 of the houseboat so that the two units 11 and 12 fair into one another when the boat is positioned on the prime mover, resulting in the combination vehicle appearing as a unitary structure, as is illustrated in FIG. 1. Once this preferred requirement has been met, the remaining configuration of the prime mover is largely a matter of style, and for this reason it is shown in FIG. 1 in dotted outline.

Prime mover 11 is provided with conventional support wheels 19 and 20 near the front and rear thereof respectively. In conventional manner, wheels 20 are the drive wheels of the vehicle, although front wheel drive may be employed without departing materially from the invention.

Figure 2:
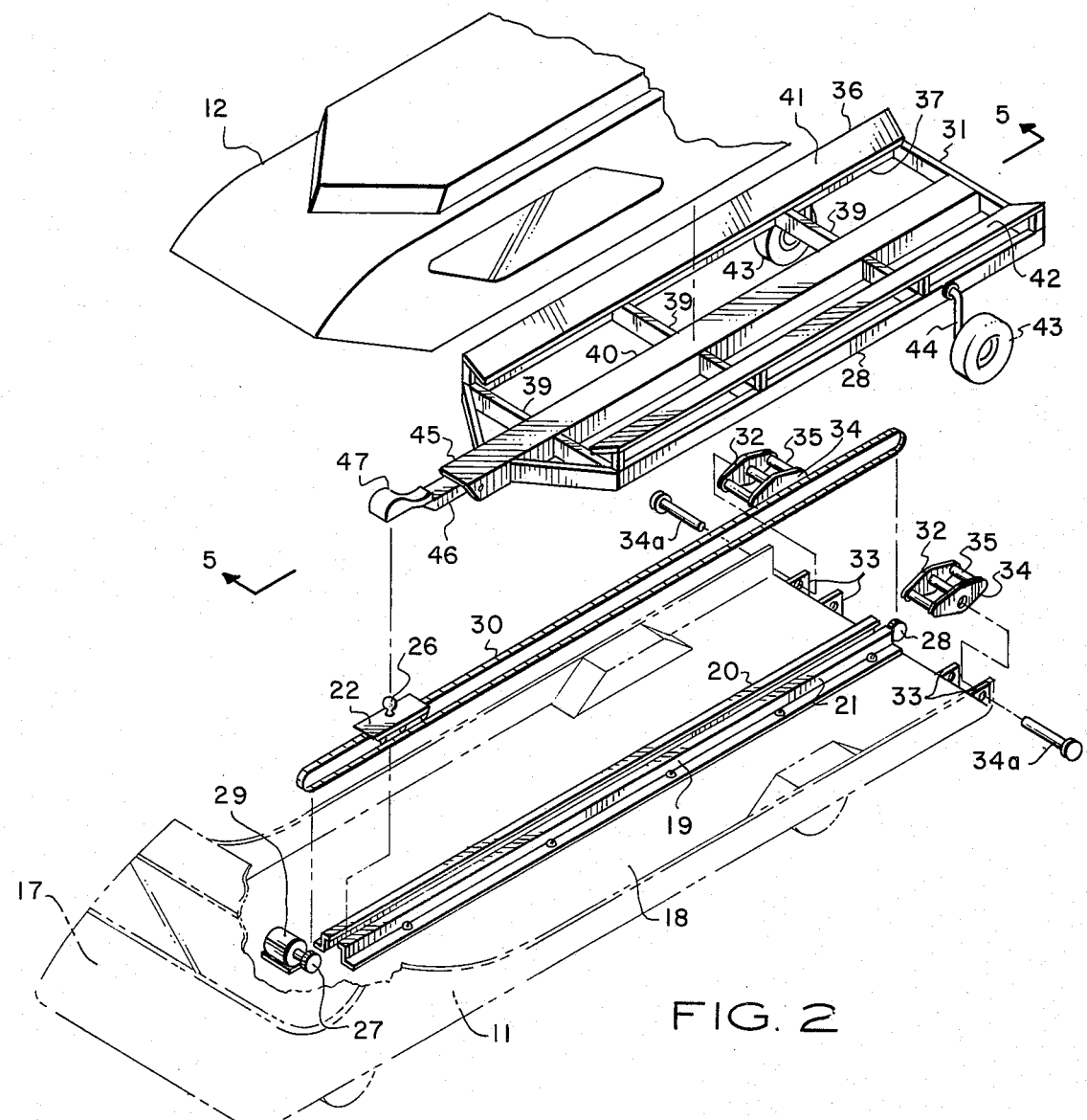
FIG. 2 is an exploded isometric view of the embodiment of FIG. 1 illustrating the open topped bed of the prime mover, the equipment associated therewith, the wheeled cradle employed in accordance with the invention, and the boat hull employed in accordance with the invention.
Figure 5:
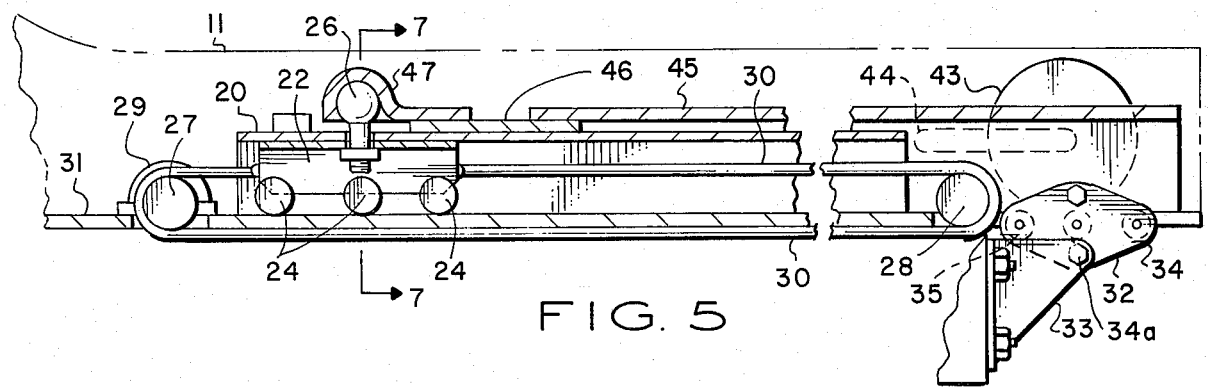
FIG. 5 is a sectional side elevational view of the guide track and cradle drive equipment and a portion of the wheeled cradle employed in the first embodiment of the invention, the section being taken on the line 5—5 of FIG. 2.
Figure 7:
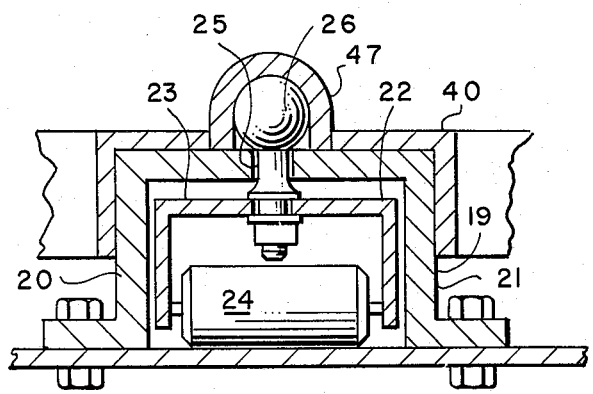
FIG. 7 is an enlarged sectional front elevational view of a portion of the guide track drive means and cradle shown in FIG. 5, the section being taken on the line 7—7 of FIG. 5.

Attention is now directed to FIGS. 2, 5 and 7, which show in greater detail the structural features of the embodiment of FIG. 1. A guide track 19 is mounted on the bed 18 of the prime mover. As shown in FIG. 2, it extends longitudinally of the bed for substantially the full length thereof and is centrally located in the bed. In its preferred form, guide track 19 is formed of two Z-shaped beams 20 and 21 which are bolted to the floor of bed 18 in facing relationship so that they, together with the floor of bed 18, define a long box-shaped channel having a slot running along the top thereof. See FIGS. 2 and 7.

A launching dolly 22 is located within the guide track 19. While its precise structure may be varied, a very simple and sturdy dolly 22 can be constructed, as shown best in FIGS. 5 and 7, from a downwardly oriented channel beam 23, in the channel of which are journaled three rollers 24. When the dolly 22 is positioned inside the box-like guide track 19, it can roll on rollers 24 back and forth in the guide track. Mounted on the top of channel member 23 is a post 25 with a ball 26 at the upper end thereof. Ball 26 is configured substantially like those employed in conventional trailer hitches. As is illustrated best in FIGS. 5 and 7, the post 25 extends upwardly through the slot defined by beams 20 and 21 so that the ball 26 is located above the guide track 19.

A power driven sprocket 27 and an idler sprocket 28 are mounted for rotation on the floor of bed 18 at the front and back and respectively of guide track 19. Sprocket 27 is driven by electric motor 29, which may conveniently be powered from the electrical system of the prime mover. A chain 30 is trained over sprockets 27 and 28 so that its upper run lies within the box section of guide track 19, and its lower run lies beneath the floor 31 of bed 18 (see FIG. 5). One end of chain 30 is attached to each end of launching dolly 22. In this manner, provision is made for propelling dolly 22 back and forth in guide track 19 upon operation of motor 29 in one direction or the other. Suitable detector switches (not shown) can be positioned near each end of guide track 19 for turning off motor 29 when the dolly approaches an end of guide track 19 and encounters a detector switch.

It will become apparent from the discussion below that the yet to be described wheeled cradle is desirably tilted in the course of being displaced from or reloaded upon the bed 18 of prime mover 11. To assist and facilitate such movement of the cradle, the bed 18 is provided at the rear end thereof with tilting dollies 32. One of these is located at each side of bed 18, generally in line with longitudinal frame members of the wheeled cradle. While the tilting dollies may take various forms, they are conveniently provided by including brackets 33 extending rearwardly from bed 18 to which are pivotally mounted parallel plates 34 having a plurality of rollers 35 journally mounted therebetween for rotation. The pivotal mounting of plates 34 is effected by pins 34a which pass through them and brackets 33.

A wheeled cradle 36 is provided for supporting the houseboat 12, for displacing it off of and onto the prime mover 11, and for functioning as a launching and recovery trailer. As can be seen from FIG. 2, cradle 36 has a generally rectangular frame built up of longitudinal side rails 37 and 38, cross beams 39, and main longitudinal beam 40. Beam 40 is preferably in the form of an inverted channel proportioned to fit over and slidably engage the guide track 19. (See FIG. 7.)

Above the side rails 37 and 38 are hull supporting members 41 and 42. Since the hull of the embodiment of FIG. 1 is of the modified flatboat type, these are shown in FIG. 2 as straight padded rails set at an angle to accomodate the shallow V-shape of such a hull. When hulls of more complex development are employed in accordance with the invention, supports 41 and 42 may be shaped to conform to the development of the hull.

While the wheeled cradle of FIG. 2 is positioned on prime mover bed 18, it is fully supported thereby and there is no need for independent ground support means. However, when cradle 36 is displaced to the rear of prime mover 11 for boat launching and recovery operations, or for detachment and parking, it needs its own ground support means. These are provided in the form of retractable wheels 43. Each wheel 43, which is preferably of the small diameter pneumatic trailer type, is journaled onto the end of a strut 44. Struts 44 are in turn journaled into side rails 37 and 38 near the rear ends thereof for pivoting the wheels 44 between a down or ground engaging position as shown in FIG. 2, and a retracted or up position as shown in FIG. 5. Suitable latch means (not shown) are provided to lock the wheels 43 in their up and down positions, and preferably, provision is made to bias struts 44 downwardly upon release of the lock-up latches.

The main longitudinal beam 40 of cradle 36 is preferably longer than side rails 37 and 38. Near its front end it is provided with an articulated joint 45 so that the extreme front portion 46 of beam 40 may assume an angle to the remainder of the beam 40 as the cradle 36 tilts in the course of being moved onto and off of bed 18 of prime mover 11. The exact position of joint 45 is a function of the cradle length, the height of bed 18 and the size of wheels 43 and their struts 44, and in various embodiments of the invention it may be accordingly varied. The extreme front portion 46 of beam 40 terminates in a socket 47, which fits over and engages ball 26 on dolly 22 in the manner of a trailer hitch.

With the foregoing description of the equipment of FIGS. 1, 2, 5 and 7 in hand, the mode of operation of this embodiment of the invention can now be described. With the equipment arranged as illustrated in FIG. 1, the unit can be driven along the highways at high speeds, and on unimproved surfaces, such as campsites and launching areas, at low speeds. When the unit is parked, the cabin 13 of the houseboat 12 may be used as living quarters in the manner of a camper.

When it is desired to launch boat 12, the unit 10 is positioned on a relatively level area approximately twice its length. Latches (not shown) locking cradle 36 on bed 18 are released, and motor 29 is operated to drive dolly 22 and cradle 36 rearwardly until the wheels 43 and struts 44 are positioned behind prime mover 11. At this point the lockup latches for wheels 43 are released and the struts 44 swing the wheels 43 to their down and latched position.

Motor 29 continues to drive dolly 22 and cradle 36 with boat 12 thereon to the rear. Such action ultimately shifts the center of gravity of the boat-and-cradle combination to the rear of tilting dollies 32, whereupon the boat-and-cradle combination tilts downwardly to the rear until wheels 43 engage the ground and begin to assume the weight of the cradle and boat. Continued operation of motor 29 displaces progressively greater portions of cradle 36 out of the truck 11. When dolly 22 reaches the rear end of guide track 19, motor 29 is stopped, and the overall configuration of the unit is that of a pickup truck (prime mover 11) having a boat trailer (cradle 36) hitched behind it with a houseboat 12 thereon.

The cradle 36 is then maneuvered down a launching ramp until it is in water deep enough to float boat 12 off of it. Alternately, cradle 36 may be parked at a suitable spot with boat 12 still positioned thereon, and the cabin of the boat used for living accomodations in the manner of a house trailer while prime mover 11 is operated independently for transportation as a pickup truck.

Figure 3:
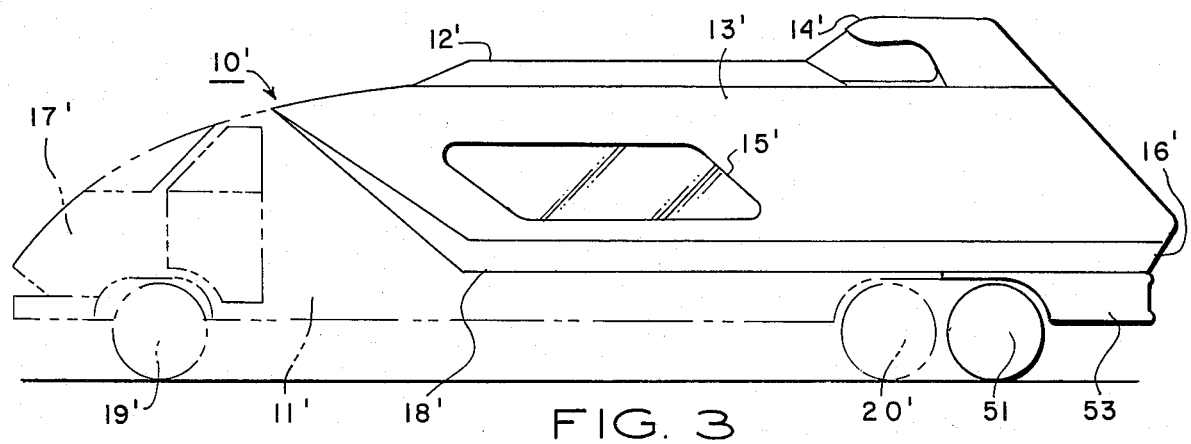
FIG. 3 is a side elevational view, similar to FIG. 1, of another embodiment of the invention, which is especially suitable for large houseboats.
Figure 4:
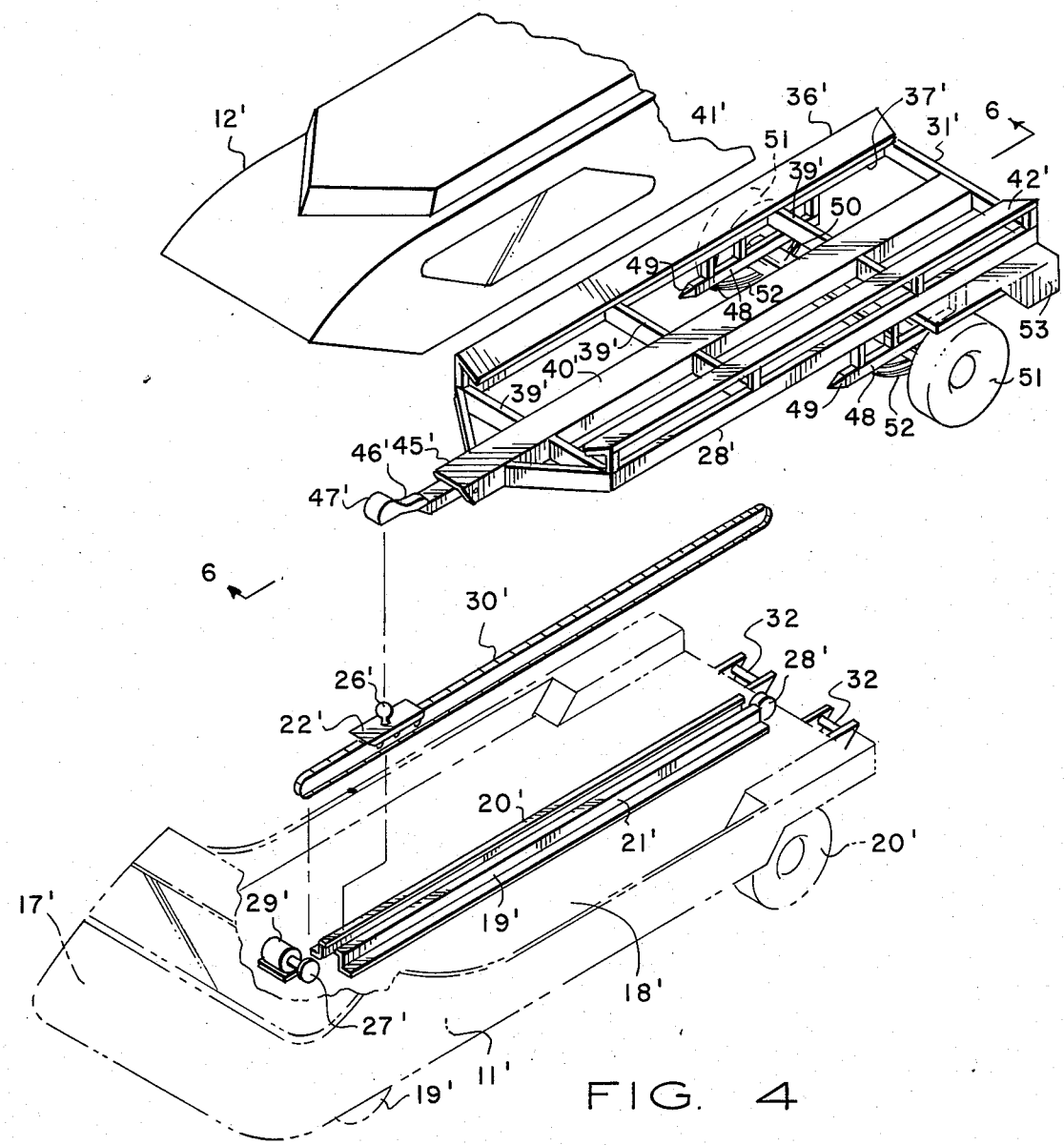
FIG. 4 is an exploded isometric view, similar to FIG. 2, of the embodiment of the invention illustrated in FIG. 3.
Figure 6:
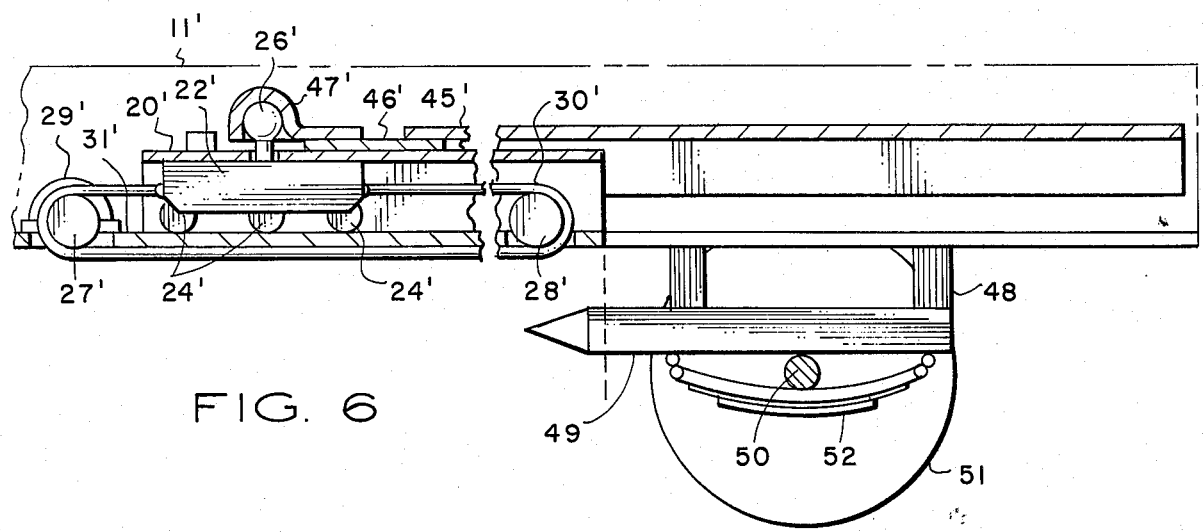
FIG. 6 is a cross-sectional side elevational view of the guide track and cradle drive equipment and a portion of the wheeled trailer employed in the second embodiment of the invention, the section being taken on the line 6—6 of FIG. 4.

A comparison of FIGS. 1, 2 and 5 on the one hand with FIGS. 3, 4 and 6 on the other hand reveals that in many respects the embodiment of FIG. 3 involves equipment constructed and arranged similarly to that of FIG. 1. For this reason, the aspects of the FIG. 3 embodiment which are substantially the same as those of FIG. 1 are not discussed here in detail, and the following discussion is directed to those respects in which the two embodiments differ. Primed numbers are employed to indicate parts corresponding to those of the first embodiment.

The prime mover 11' shown in FIG. 4 has substantially no overhang behind rear wheels 20', in contrast to that of FIG. 2. Inasmuch as little tilting action of cradle 36' is contemplated, tilting dollies 32, are replaced by simple assist rollers 32', which are thus located relatively close to the rear axle of prime mover 11'.

Trailer 36' is not equipped with retractable wheels. Instead, an underframe 48 is attached to the underside of wheeled cradle 36' near the rear end thereof. Underframe 48 includes longitudinal beams 49 which are pointed at the front end to register with and interlock with openings (not shown) in the chassis frame members of prime mover 11'. An axle 50, having wheels 51 mounted at either end thereof is mounted by springs 52 to underframe 48. As can best be seen in FIG. 4, cradle 36' includes some body work 53 to complement the body work of the prime mover 11'.

In operation, wheels 51 support a portion of the load imposed by houseboat 12' even when cradle 36' is fully nested on the bed 18' of the prime mover 11'. In effect, the cradle 36' becomes integrated with the chassis or frame of prime mover 11' to provide a strong structure (including two additional load bearing wheels) to support a large houseboat while the unit is employed as a road vehicle. In other respects, cradle 36' functions as a launch, parking, and recovery device in the same manner as cradle 36 of the first embodiment discussed above.

From the foregoing, it can be seen that in accordance with the present invention a recreational vehicle is provided which combines the advantages of campers, boat trailers and houseboats, and eliminates many of their individual short comings.

What is claimed is:

1. A combined vehicle and boat comprising a prime mover having an open topped bed at the rear end therof; a wheeled cradle having a pair of support wheels slideably mounting said cradle on said open topped bed for displacement rearwardly to a position behind said prime mover, said support wheels being pivotally connected to said cradle for downward movement to a ground engaging position upon said rearward displacement; a box-like beam having a longitudinal slot in the top thereof and mounted in said bed longitudinally and forming a guide track therealong; a dolly running within said guide track; connecting means projecting through said slot and being connected to the front end of said wheeled cradle; said dolly and said connecting means comprising a guide means; drive means for driving said guide means forwardly and backwardly along said guide track; and a boat hull, so proportioned with respect to said vehicle that one fairs into the other and presents the appearance of a unitary structure when said boat hull is positioned on said cradle.

2. Apparatus in accordance with claim 1 in which said wheeled cradle includes an articulated joint providing for tilting of said cradle in the course of rearward displacement thereof, and in which said bed is provided with cradle engaging rollers adjacent the rear end thereof, said rollers being journally mounted in a frame pivotally connected to said bed for tiltable engagement with said cradle to conform to the angle of disposition thereof.

* * * * *